United States Patent [19]

Hasegawa

[11] Patent Number: 4,643,558
[45] Date of Patent: Feb. 17, 1987

[54] ELECTRONIC POWER SUPPLY
[75] Inventor: Hiroshi Hasegawa, Tokyo, Japan
[73] Assignee: Nippon Kogaku K. K., Tokyo, Japan
[21] Appl. No.: 773,890
[22] Filed: Sep. 9, 1985
[30] Foreign Application Priority Data
  Sep. 19, 1984 [JP] Japan .................. 59-195973
[51] Int. Cl.⁴ .................. G03B 7/26; H02J 1/00
[52] U.S. Cl. .................. 354/484; 307/597;
                                   307/296 R; 328/77
[58] Field of Search .......... 354/484; 307/296 R,
                          307/592, 597; 328/77; 340/815.3, 322
[56]          References Cited
         U.S. PATENT DOCUMENTS
  4,250,413  2/1981  Kawasaki et al. ........... 354/484 X
  4,498,751  2/1985  Goto ...................... 354/484 X FOREIGN PATENT DOCUMENTS
53161176  7/1980 Japan .

Primary Examiner—William B. Perkey
Attorney, Agent, or Firm—Shapiro and Shapiro

[57]          ABSTRACT

The present invention provides an electronic power supply system adapted to be used in a camera comprising a switching circuit for supplying a load with power therethrough in response to the operation of a shutter button and a control circuit adapted to be energized through the switching circuit and capable of controlling the energization and deenergization of the switching circuit, whereby the switching circuit can be controlled without malfunction even if the control circuit becomes unstable after the switching circuit has been deenergized.

10 Claims, 2 Drawing Figures

ELECTRONIC POWER SUPPLY

BACKGROUND OF THE INVENTION

1. Field of the Invention

The present invention relates to an electronic power supply for cameras and the like.

2. Description of the Prior Art

There is known a camera including an electronic power supply adapted to energize electronic instruments such as an exposure meter and the like when a release button is depressed halfway and to maintain the energization for a predetermined time after the release button is released.

For example, such a power supply system comprises a semiconductor switching circuit energized in response to the halfway depression of the release button, a circuit for maintaining the energization of the switching circuit for a predetermined time in response to the release of the release button and a circuit for energizing loads such as an exposure meter and others when the switching circuit is energized.

When the switching circuit is transformed from its energized state into its deenergized state, however, the load may become unstable. This may reenergize the switching circuit spuriously.

SUMMARY OF THE INVENTION

It is therefore an object of the present invention to provide an electronic power supply suitable for use in cameras and the like, which is simplified in construction and is not subject to malfunction.

To accomplish the above object, the present invention provides an electronic power supply comprising a switching circuit for supplying a load with power therethrough and a control circuit adapted to be energized through the switching circuit and capable of controlling the energization and deenergization of the switching circuit, whereby the switching circuit can be controlled without malfunction even if the control circuit becomes unstable after the switching circuit has been deenergized.

DESCRIPTION OF PREFERRED EMBODIMENTS

Figure 1:
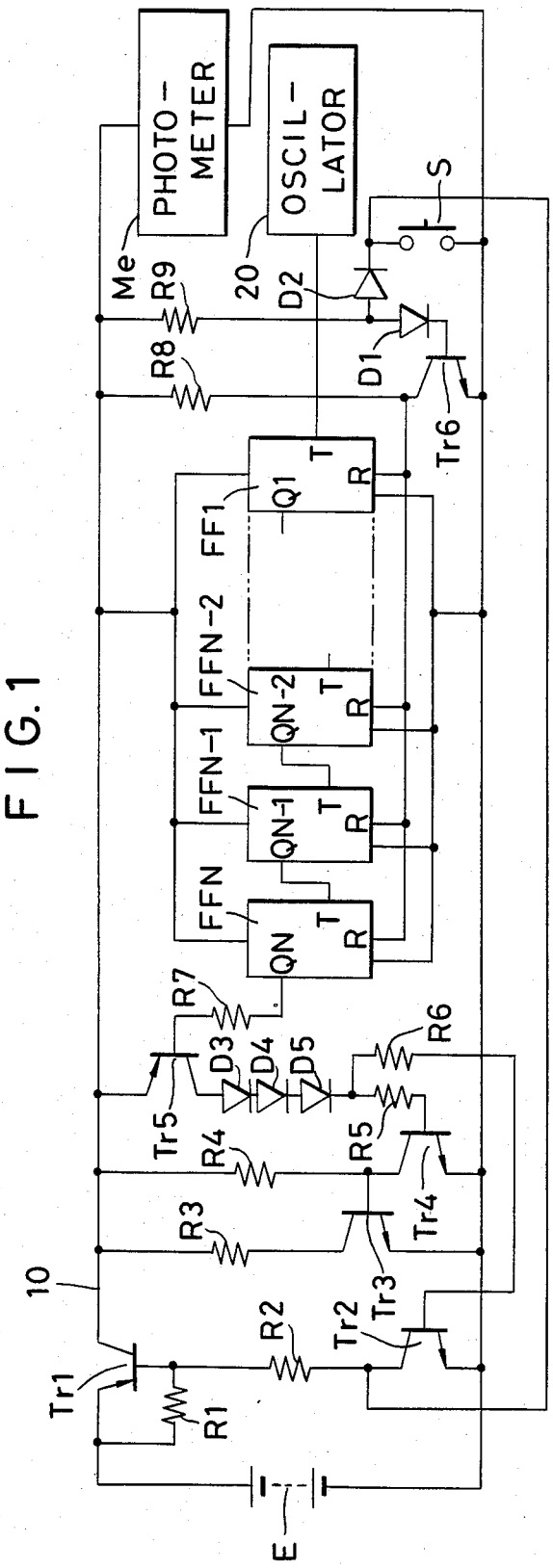
FIG. 1 is a circuit diagram of a preferred embodiment of the present invention.

Referring now to FIG. 1, there is shown an electronic power supply of a preferred embodiment of the present invention which is incorporated into a camera. The power supply comprises a switching transistor Tr1 interposed between a power source E and a parallel circuit which includes an exposure meter or photometer Me and flip flops FF1-FFN. The base of the transistor TR1 is connected with the ground through a resistor R2 and a switch S. The switch S is closed or turned on by a release button (not shown) during its first stroke. When the release button is further depressed during its second stroke, a shutter release mechanism (not shown) in the camera is driven.

When the switch S is closed, the transistor Tr1 is shifted to its conducting state. Voltage E1 on a line 10 connected with the collector of the transistor Tr1 is then changed to be E1. On the other hand, a transistor Tr6 having its base grounded through diodes D1 and D2 is held in its nonconducting state so that a reset voltage from a collector load R8 becomes "high". All the flip flops FF1-FFN are reset with the output QN being held "low". The flip flops FF1-FFN form a counter which under its reset state, does not count clock pulses from an oscillator 20. Therefore, all the outputs Q1-QN of the flip flops FF1-FFN will be maintained "low". The base of a transistor Tr5 is energized by the output QN through a resistor R7. At this time, the transistor Tr5 is placed in its conducting state. Therefore, transistors Tr2 and Tr4 are in their conducting state while a transistor Tr3 is in its nonconducting state. When the switch S is closed, thus, the transistor Tr2 will be placed in its conducting state and parallel to the switch S. As a result, the transistor Tr1 can be held in its conducting state even if the switch S is opened by releasing the release button. Moreover, the transistor Tr1 is in its conducting state immediately after the switch S is opened, because of the output QN maintained "low". The voltage E1 remains at a level "E1". When the switch S is opened, a transistor Tr6 is shifted to its conducting state. After passage of a predetermined period of time, the output QN of the flip flop FFN is changed from "low" to "high" to change the states of the transistors Tr2-Tr5 so that the transistor Tr1 will be blocked with the voltage E1 becoming zero. When the transistor Tr1 is in its conducting state, the photometer Me and the counter (FF1-FFN) are supplied with a power through this conducting transistor Tr1.

This operation will first be described by assuming that diodes D3-D5 are absent or that the collector of the transistor Tr5 is connected directly with a junction between resistors R5 and R6. When the output QN of the flip flop FFN becomes "high" on passage of the predetermined period of time after the switch S has been opened, the transistor Tr5 is placed in its nonconducting state. Thus, the transistors Tr2 and Tr4 also are placed in their nonconducting state so that the photometer Me and the counter FF1-FFN are disconnected from the power source E. The transient state of this operation will be described below in detail.

Since the transistor Tr6 is placed in its conducting state when the switch S is opened, the reset output becomes "low" so that the counter consisting of the flip flops FF1-FFN begins to count clock pulses from the oscillator 20. When the passage of a predetermined period of time is detected during this counting operation, the output QN is changed to be "high" so that the transistors Tr5, Tr4, Tr2 and Tr1 will be placed in their nonconducting state. The transistor Tr3 is supplied with a base current from the remaining charge in capacitor means included in the photometer Me and others. The transistor Tr3 is therefore in its conducting state and serves to discharge the remaining charge in the photometer Me through the resistor R3 connected with the collector of the transistor Tr3 with a relatively small time constant. Since the flip flops FF1-FFN are connected with a line when connects the transistor Tr1 with the photometer Me, the voltage E1 will be reduced at the same speed as in the photometer Me. Now assuming that the lower limit of the voltage at which the flip flops operate stably is $E_S$ and that the level of the voltage at which they can operate unstably is $E_A$ ($E_S > E_A$), the voltage E1 is reduced when the transistor Tr1 is in its nonconducting state. If $E_A$ becomes smaller than E1 and E1 becomes smaller than $E_S$, the flip flops FF1–FFN may malfunction with the output QN of the flip flop FFN being changed to be "low". The transistor Tr5, which must be already in its nonconducting state after passage of the predetermined period of time, may be in its conducting state to return the voltage E to its original level (E1). This is because when the diodes D3–D5 are absent, the base of the transistor Tr2 is supplied with a current sufficient to place it in its conducting state through the conducting transistor Tr5 even if the voltage E1 is reduced. When the diodes D3–D5 are present as in the illustrated embodiment of the present invention, however, a condition under which the transistor Tr2 is in its conducting state is such that the supply voltage E1 is equal to or larger than the sum of the base-emitter voltage $V_{BE2}$ of the transistor Tr2, the summed forward voltage $3V_D$ of the diodes D3–D5, the emitter-collector voltage $V_{CE5}$ of the conducting transistor Tr5 and the voltage $V_R$ of resistor R6 required to provide the base current of the transistor Tr2. Namely, the following relationship should be satisfied:

$$E1 \geq V_{BE2} + 3V_D + V_{CE5} + V_R \tag{1}$$

If the supply voltage E1 is reduced below the above total voltage ($V_{BE2}+3V_D+V_{CE5}+V_R$), the transistor Tr5 will not be placed in its conducting state to provide any malfunction even though the transistor Tr5 is placed in its conducting state. Therefore, when the voltage E (that is, the total voltage $V_{BE2}+3V_D+V_{CE5}+V_R$ referred to as "Ex" below) is set to be larger than the minimum operation guaranteeing voltage $E_S$ of the aforementioned flip flops, any malfunction can fully be prevented as the voltage E1 is being reduced.

Figure 2:
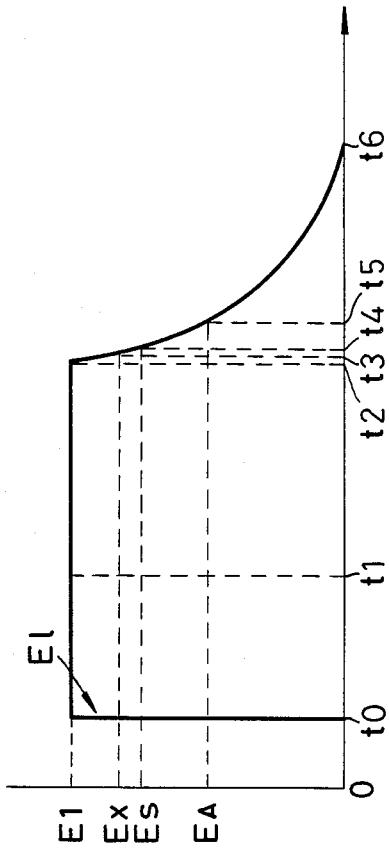
FIG. 2 illustrates variations of the circuit supply voltage E1.

FIG. 2 illustrates the voltage E1 in the above embodiment of the present invention. When the switch S is closed at time t0, the voltage E1 is increased to the voltage E1 substantially equal to the output voltage of the power source E. The switch S is in its closed state between times t0 and t1. When the switch S is opened time t1, the flip flops FF1–FFN are released from their reset state and then initiate their counting operation for a predetermined period of time. After passage of the predetermined period of time and at time t2, the output QN of the flip flop FFN becomes "high" so that the transistor Tr1 will be placed in its nonconducting state. Thus, the supply voltage E1 is reduced as shown in FIG. 2. The limit of the voltage E1 required to operate the transistor Tr2 is denoted "Ex", the limit of the voltage E1 required to operate the flip flops FF1–FFN in a stable manner is designated "$E_S$", and the limit of the voltage E1 capable of operating the flip flops FF1–FFN in an unstable manner is denoted "$E_A$". After time t5, the flip flops FF1–FFN become inoperative so that any malfunction will not be produced. It is apparent from the foregoing that any malfunction will not be produced in the transistor Tr2 due to the unstable operation of the flip flops FF1–FFN since the voltage Ex is necessarily produced before reaching the voltage $E_S$ as the voltage E1 is being reduced. In the illustrated embodiment, furthermore, the resistors R3, R4 and the transistor Tr3 form a rapid discharge circuit for decreasing the period of time (t2–t6) required for the voltage E1 to change from E1 to zero.

Although the present invention has been described as to the diodes D3–D5, these diodes may be replaced by Zener diode and the like. In other words, there may be used such an element in which there will not be a change in voltage drop even if the current therethrough is changed.

In accordance with the present invention, a simplified mechanism can positively prevent the switching means from malfunctioning due to the unstable operation of the load circuit when the switching means is changed from its conducting state to its nonconducting state. Moreover, the present invention does not require the use of any capacitor for preventing the malfunction of the switching means. The entire system can be miniaturized to provide the optimum IC circuitry.

I claim:

1. An electronic power supply system adapted to be used in a camera comprising a power source and a load adapted to receive power from said power source in response to an operation of a shutter button, said system comprising:
   (a) switching means having conducting and nonconducting states, said switching means being placed in its conducting state in response to the operation of said shutter button;
   (b) control means for generating a control signal for controlling said switching means, said switching means being maintained in its conducting state during receipt of said control signal, said control means being adapted to receive a voltage from said power source to generate said control signal when said switching means is in its conducting state, and the control means operating in an unstable manner when the voltage applied to said control means is below a first predetermined level;
   (c) means for transmitting said control signal to said switching means; and
   (d) means for blocking the transmission of said control signal to said switching means in response to the reduction of the voltage applied to said control means below a second predetermined level which is above said first predetermined level.

2. An electronic power supply system as defined in claim 1 wherein said control means is adapted to generate said control signal independently of said shutter button when the voltage applied to said control means is below said second predetermined level.

3. An electronic power supply system as defined in claim 1 wherein said transmitting means includes a transistor for transmitting said control signal to said switching means when said transistor is placed in its conducting state and said blocking means includes at least one diode and wherein said second predetermined level of the voltage is larger than the sum of the base-emitter voltage of said transistor and the forward voltage of said at least one diode.

4. An electronic power supply system as defined in claim 1 wherein said switching means includes a first transistor means, said transmitting means including a second transistor means, said blocking means including a third transistor means having its base into which said control signal is inputted and diode means having an anode connected with said third transistor means, the base of said first transistor means being connected with the collector of said second transistor means, the emitter of said first transistor means being connected with one of two output terminals of said power source, the emitter of said second transistor means being connected with the other output terminal of said power source, the emitter of said third transistor means being connected with the collector of said first transistor means, and the cathode of said diode means being connected with the base of said second transistor means.

5. An apparatus for supplying power from a power source to a load, comprising:
 (a) switching means having conducting and nonconducting states, said apparatus being adapted to supply power to said load when said switching means is in its conducting state;
 (b) control means for generating a control signal used to control said switching means;
 (c) means for transmitting said control signal to said switching means, said switching means being maintained at its conducting state during receipt of said control signal, said control means being adapted to receive the voltage from said power source to generate said control signal when said switching means is in its conducting state and the control means operating in an unstable manner when the voltage applied to said control means is below a first predetermined level; and
 (d) means for blocking the transmission of said control signal to said switching means when the voltage applied to said control means is below a second predetermined level which is above said first predetermined level.

6. An apparatus as defined in claim 5 wherein said apparatus further comprises an operating member actuated to place said switching means in its conducting state, said operating member having first and second states, said switching means being placed in its conducting state independently of said control signal when said member is transferred from said first state to said second state.

7. An apparatus as defined in claim 6 wherein said control means is adapted to generate said control signal when said member is transferred from said first state to said second state.

8. An electronic power supply system as defined in claim 1, wherein said transmitting means includes a transistor for transmitting said control signal to said switching means when said transistor is placed in its conducting state, said blocking means includes diode means for controlling the base-emitter voltage of said transistor, said transistor is placed in its nonconducting state in response to the reduction of the base-emitter voltage of said transistor below a third predetermined level and said diode means reduces the base-emitter voltage of said transistor below said third predetermined level in response to the reduction of the voltage applied to said control means below said second predetermined level.

9. An electronic power supply system as defined in claim 8, wherein said blocking means includes another transistor having its base into which said control signal is inputted, said diode means includes an anode connected with the collector of said another transistor and a cathode connected with the base of the first-mentioned transistor, and the voltage between the emitter of said another transistor and the emitter of said first-mentioned transistor corresponds to the voltage applied to said control means.

10. An electronic power supply system as defined in claim 9, wherein the forward voltage of said diode means is provided so that the base-emitter voltage of said first-mentioned transistor is below said third predetermined voltage when the voltage applied to said control means is below said second predetermined level.

* * * * *